June 1, 1965   K. FRANCK ETAL   3,187,176
LUMINAIRE
Filed Oct. 24, 1962   3 Sheets-Sheet 1
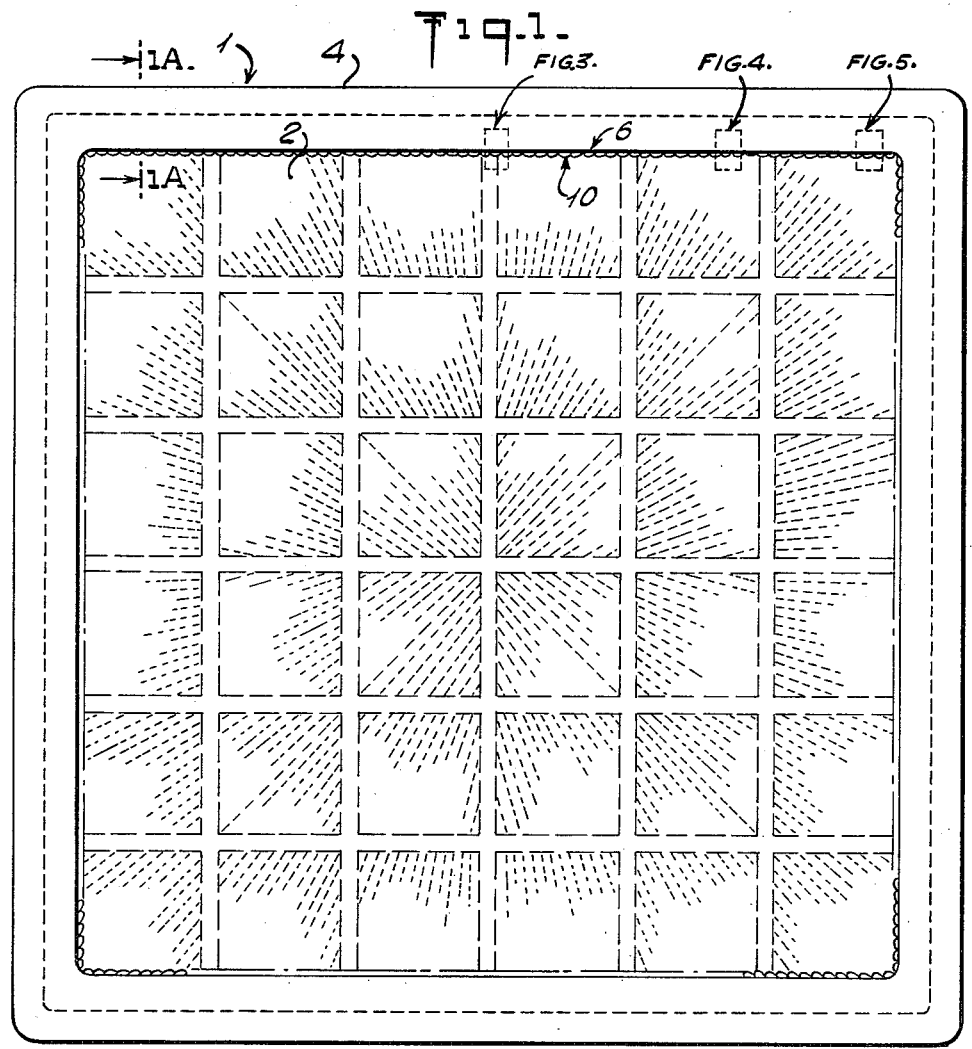
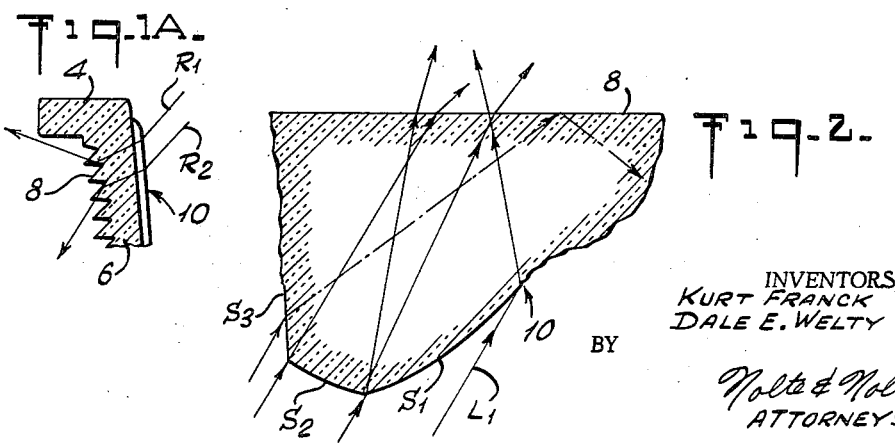
INVENTORS
KURT FRANCK
DALE E. WELTY
BY
Nolte & Nolte
ATTORNEYS

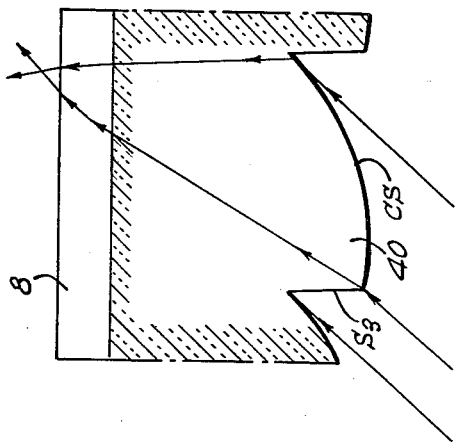
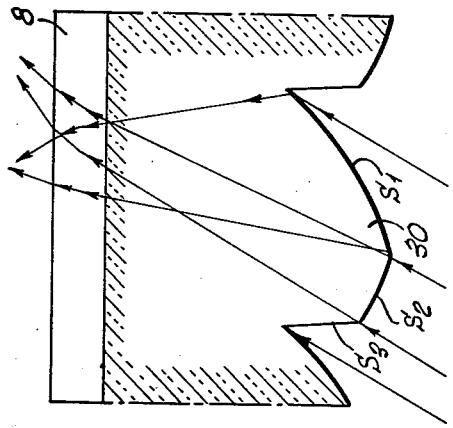
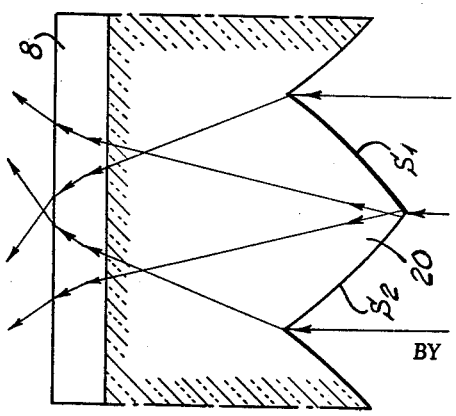

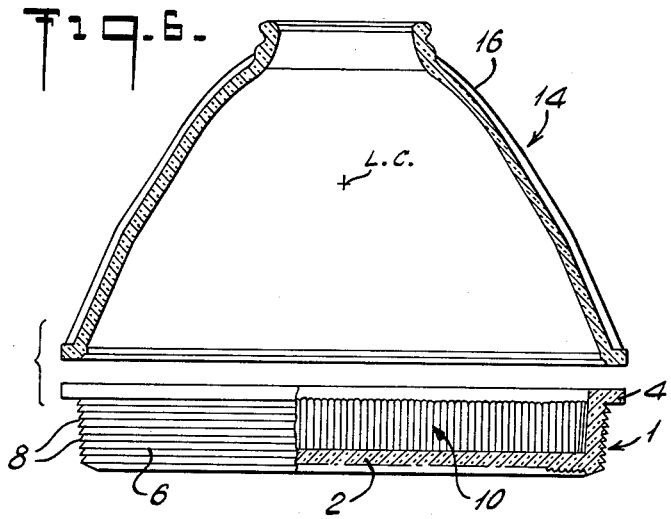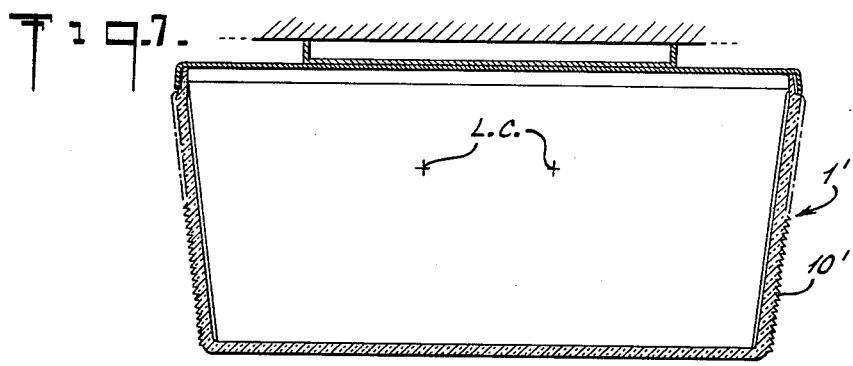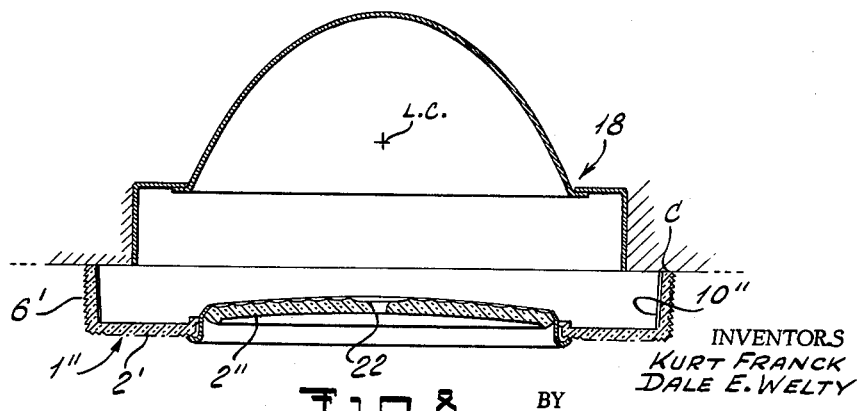

United States Patent Office 3,187,176
Patented June 1, 1965

3,187,176
LUMINAIRE
Kurt Franck, Newark, and Dale E. Welty, Jacksontown, Ohio, assignors to Holophane Company, Inc., New York, N.Y., a corporation of Delaware
Filed Oct. 24, 1962, Ser. No. 232,781
10 Claims. (Cl. 240—106)

The present invention relates to prism structures for use as light diffusion elements and has particular application to prismatic lenses utilizing light directing prisms, wherein the light diffusion prism structures of the invention effect optimum diffusion and efficient use of the directed light with the best possible brightness intensity or glare considerations at substantially all points along the extensions of the light directing prisms.

The invention is particularly applicable to prismatic sidewalls used in recessed or ceiling-mounted luminaires and which produce both downward and upward components of directed light, the upward component of light being cast upon the ceiling to reduce the contrast between the ceiling and the lighted luminaires.

In such luminaires, horizontal refracting or reflecting-refracting prisms are used on the outer surfaces of the sidewalls for creating the desirable upward and downward light distribution patterns. Previously, vertical flutes have been provided on the interior of the lens sidewalls for diffusing light laterally to eliminate horizontal striations of bright light observable along the peaks and valleys of the outer horizontal prisms. However, the inside fluting of the sidewalls causes striations to be projected onto the ceiling, and too, upon direct observation, bright dots are observable upon the lens along the peaks and valleys of the outside prisms.

As an improvement over the prior art sidewall flutes, it has been proposed in United States Letters Patent No. 2,887,568 that the vertical inside flutes should be combined with vertical prisms to give a better and more predictable light distribution from the vertical walls of a lens. In that patent, the central portion of the end panels of a corridor luminaire lens was provided with straight-faced light splitting prisms to produce a lateral spreading of the light across a corridor, whereby the leakage light, which was previously directly observable, was directed laterally away from longitudinal viewing angles onto the corridor walls. However, where no limitations of the lateral viewing angles is present, such a lens is not satisfactory, because in areas which are wider than corridors, an observer can view a lens not only frontally, but also at the lateral angles at which the leakage light has been spread.

It is an object of the invention to provide prismatically controlled diffusion of light for the purpose of substantially decreasing glare along the entire length of light directing prisms and throughout a comparatively wide range of viewing angles.

A more specific object of the invention is to prismatically control a radiant emission of light to produce the diffusion patterns of the invention.

It is another object of the invention to provide an illuminating lens for ceiling-mounted luminaires having excellent lateral illumination throughout wide lateral viewing angles and at the same time having minimum sidewall brightness non-uniformities and glare.

Still another object of the invention is to provide such a lens wherein the upward component of light is directed in a controlled pattern with high efficiency of light transmission while providing the desired control of the downward component of light with minimum sidewall brightness at all normal viewing angles.

In a lens according to the invention, wherein, e.g. the exterior of a sidewall is provided with horizontal reflecting-refracting prisms disposed below or above the plane of a point light source, the interior face of the sidewall is provided with side-by-side vertical diffusing prisms of the invention along the entire inside sidewall surface. These inside prisms are curved-face prisms and by varying the refracting power of the prisms from the center of the sidewall outwardly and by asymmetrically arranging the curved surfaces of each prism located laterally of the wall center so as to receive equal amounts of light from the light source, uniform surface brightness and lateral control of both the downward and upward components of the light are achieved.

In such an arrangement, a two-sided symmetrical, curved-face prism is disposed centrally of the sidewall for controlling light from the source in planes approximately perpendicular to the sidewall. This prism structure is developed through laterally adjacent prisms to a three-sided light splitting prism having two active, asymmetrically arranged curved faces for controlling light from the source in planes at intermediate lateral angles relative to normal. The third surface is used to return the prism to the plane of the sidewalls. This three-sided prism structure is further developed through laterally adjacent prisms, a two-sided light splitting prism having a single active curved-face for controlling light from the source in planes at far angles from the normal. The inactive surface returns the prism to the plane of the sidewall and the curved surfaces of each of the prisms having two active surfaces are so constructed as to intercept equal amounts of light. This insures an even and diffuse ceiling illumination where there is provided an upward component of light.

This concept results in the prisms becoming shallower from the center portion of the sidewall toward the corner and in a gradual changing of slope of the prism sides from one prism to the next. In this respect, the invention contemplates using the deepest possible curved-face splitting prisms at any given lateral location along the lens sidewall to obtain optimum diffusion of the ceiling component while satisfying the best possible sidewall brightness considerations and without exceeding the maximum slopes of the prism sides for efficient use of the downward component of light.

Other features and advantages of the invention will become apparent from the following detailed description of specific embodiments of the invention, reference being made to the drawings, wherein:

FIG. 1 is a fragmentary top plan view of a lens utilizing the prism constructions of the invention;

FIG. 1A is a sectional view along the lines 1A—1A of FIG. 1;

FIG. 2 is a diagrammatic sectional view of a prism constructed in accordance with the invention;

FIGS. 3, 4 and 5 are enlarged fragmentary sectional views of the sidewall of the lens of FIG. 1 taken at the areas indicated in FIG. 1; and FIGS. 6–8 are vertical sectional views through various luminaire structures, the lens sidewalls of which may embody the prism structures of the invention.

The lens of the invention to be described is in the form of a square having upstanding sidewalls, but it is to be understood that the invention can also be embodied in other illuminating lens forms wherein radiantly emitted light strikes a lens wall at lateral angles not essentially perpendicular to the major plane of the lens wall.

In FIGS. 1 and 1A (and in the fixture of FIG. 6), lens 1, having a bottom portion 2, upon which prism (not detailed) are disposed to control downward light distribution, upstanding sidewalls 6 extend from the bottom portion 2 and a mounting rim 4 extends outwardly from the upper ends of the upstanding sidewalls for supporting the lens in a luminaire fixture.

As best shown in FIG. 1A, the outer faces of the sidewalls are covered with horizontal reflecting prisms 8, while the interior of the sidewalls are provided with the vertical curved-face light-splitting prisms 10 of the invention.

In FIG. 1A, it is seen that light rays, such as ray $R_1$, from a light source, such as L.C. in FIG. 6, striking the horizontal prisms 8 are reflected by the lower surfaces of the prism 8 into the upward component of light for illuminating the ceiling within which the fixture which mounts the lens 1 would be mounted. (See the ceiling C in FIG. 8 for instance.) Light rays, such as ray $R_2$, are reflected by the upper surfaces of prism 8 into the downward component of light. It can be appreciated that these components of light cannot be unduly diffused or insufficiently so, or their distribution erratic as concerns the purpose for which the lens is to be used.

FIG. 2 illustrates the effect of a vertical curved-face light-splitting prism 10A upon ray traces, indicated by arrowed lines, striking the prism 10A at intermediate lateral angles. The emergent ray traces indicate the wide range of viewing angles into which leakage light at the peaks and valleys of the prism 8 can be spread with such a prism.

In the embodiment of FIG. 2, the prism is constructed for disposition in planes below or above a light source. The maximum slope of the surface $S_1$ on the far side of the prism 10A, relative to the wall center, is determined for effecting the most efficient light distribution for the downward component of light near the lens center. This maximum slope of surface $S_1$ is located towards the far end of the prism and is set tangential to the lateral angle of the light striking the surface. The minimum slope of surface $S_1$, located at the near end of the prism surface, is adjusted to give the amount of diffusion required for a given application. Thus, the ray traces affected by surface $S_1$ indicate a definite diffusion of emitted light, but in a predetermined direction.

The maximum slope of the surface $S_2$ on the near side of the prism 10A, relative to the wall center, is also determined for effecting the most efficient light distribution for the downward component of light, but taking into consideration the desired distribution over the entire length of the sidewall. In this respect, as will be seen, this maximum slope will vary from one prism to the next along the sidewall, resulting in a series of vertical prisms of varying refracting powers from the wall center to the outer end. Resultingly, the light, as indicated by the ray traces affected by surface $S_2$, is directed into a diffusion pattern in which the diffused light diverges laterally to either side of the sidewalls center.

For insuring an even and diffuse ceiling illumination, surfaces $S_1$ and $S_2$ are constructed so that they intercept equal amounts of light from the source.

It should be appreciated that the possibility now arises that variation of the slopes of the curves sides $S_1$ and $S_2$ of the basic prism construction 10A and of the shallowness or deepness of the prism construction, for disposing the sides to receive light rays at all lateral angles along a sidewall, can be utilized to properly vary the range of leakage light viewing angles along the wall to thereby eliminate the dotted and striated patterns of previously poorly diffused sidewall light, while at the same time properly diffusing the light directed into the upward and downward components of light.

The prismatic conditions just discussed, necessitate another surface $S_3$, to return the prism to the original surface of the lens. This surface is set at such an angle that light incident on it, indicated by the arrowed ray traces, is internally reflected inside the sidewall and refracted back into the luminaire to keep it from being emitted in undesirable directions.

In FIGS. 3–5, the basic prism constructions of the invention are shown, starting with a deep symmetrical curved-face light splitting prism 20 located at the center of the wall 6. These sectional views are illustrative of the transition of the prism construction of the invention from the deep curved-face light splitting prism 20, through the relatively deep, three-surface, light splitting prism 30 at an intermediate location on the wall 6, to a shallow, two-faced prism 40 at the corner of the lens 2 where the two active surfaces $S_1$ and $S_2$ of the prisms 20 and 30 have been combined into a continuous surface C.S.

The distribution of the light via the horizontal outside prisms 8, as distinguished from the spread of leakage light (FIG. 2), is indicated by the paths of the arrowed ray traces in the area of the prisms 8.

From the foregoing, it can be appreciated that the development of slope, depth and curvature of the active faces of each prism disposed intermediate prisms 20, 30 and 40, presents a gradual variation from the center of the wall outwardly and on either side thereof. As previously stated, the considerations involved for the construction of each prism at each lateral angle from the wall center, include the elimination of or minimization of sidewall brightness along the peaks and valleys of the outside prisms 8, while at the same time directing the upward and downward components of light most efficiently. These ends are accomplished by controlling the lateral spread of the emitted light from the light source, along the entire sidewall 6 via the curved-face light splitting prisms 10 to effect, in the embodiment shown, a controlled gradual change in the diffusion patterns from the individual prisms, from the center of the wall 6 to the ends thereof on either side of the center.

In the embodiment described, the controlling of lateral light spread is of the type to be used for symmetric light distribution for general lighting. However, the prismatic light diffusing technique of the invention can also be used for asymmetric light distributions by varying the prism side curvature, slope and depth in accordance with the most efficient use of the components of lights with which a particular application is concerned.

Furthermore, although the lens shown is square in plan view, a lens which utilizes the invention may be curved or any shape which causes the light to strike the sidewall at lateral angles which are not essentially perpendicular to the surface of the sidewall.

In FIG. 6 a typical side wall-lens optical system is shown and which utilizes the lens described herein. In this embodiment a prismatic reflector 14, wherein light-reflecting prism 16 is provided, reflect the upward and backward emitted light towards the bottom of the lens.

In FIG. 7 a deep sidewall-lens optical system is shown including two lamps L.C. The vertical prisms 10' of the lens 1' are formed according to the invention.

In FIG. 8 another luminaire embodiment is shown, wherein the reflector housing portion 18 is shown recessed within a ceiling C. The lens 1'' in this embodiment consists of a sidewall portion 6' integral with the bottom marginal portion 2', and a separate lens bottom portion 2'', having a hole 22 therein for securing the marginal portion 2' and the separate bottom portion 2'' to the housing 18. In this embodiment the interior of the sidewalls 6' is provided with prisms 10'' according to the invention.

It is understood that the various embodiments shown in the preceding text are for the purposes of illustration only and the scope of the invention is to be interpreted from the appended claims.

We claim:

1. In combination with a point light source, a lens including at least one substantially vertically oriented light transmissive side wall extending laterally to the far ends thereof from both sides of a vertical plane through the transverse center of said wall and through said light source, said wall having an outer light emergent surface and an inner light incident surface, said wall receiving light from the source at varying angles of incidence from said transverse center to said far ends, the outer surface including a plurality of vertically adjacent horizontally extending linear light reflecting-refracting prisms, the inner surface including a first set of vertically extending and horizontally adjacent prisms, each prism of said first set having two active surfaces symmetrically disposed on either side of a plane through the apex thereof, said first set of prisms being centrally located at and laterally of said vertical plane, said inner surface including second sets of vertically extending and horizontally adjacent prisms formed laterally of either side of said first set of prisms; the improvement comprising each prism of said second set consisting of two active curved surfaces asymmetrically disposed on either side of a plane extending through the apex thereof, one of said curved surfaces being entirely convex and sloping toward said vertical plane and away from said light source and the other of said curved surfaces being entirely convex and sloping away from said vertical plane and away from said light source, said curved surface of each prism receiving an amount of incident light substanitally equal to that recieved by said other of said curved surface of the same prism.

2. In the combination of claim 1 wherein said wall receives light from said light source at vertical angles and the angles of slope of said curved surfaces of each prism of said second sets are predetermined relative to said vertical angles of light for transmitting the same into a predetermined light pattern, the angles of slope of said surfaces and their refractive power varying from one said prism of each said second set to the next.

3. In the combination of claim 2 wherein the depth of the prisms of said second sets of prisms varies laterally from one prism to the next and from deep to shallow laterally from said vertical plane.

4. In the combination of claim 3, wherein third sets of prisms are located at lateral positions at the far ends of the wall and the prisms thereof consist of a single curved surface which splits and diffuses light incident thereon, said curved surface sloping away from said vertical plane and away from said light source.

5. In the combination of claim 4, wherein the prisms of said second and said third sets of prisms are provided with straight return surfaces facing in the direction of said vertical plane and extending from the inner edges of said prisms toward said outer light emergent surface to the outer edges of next adjacent prisms, the light received from the light source by said straight surfaces passing to and being reflected by the outer surfaces of said wall back through said light incident surface.

6. In a lens including a light transmissive wall extending laterally from both sides of a plane through the transverse center thereof and when disposed at a predetermined distance relative to a point light source with said plane extending through said light source, said wall receiving light from the source at varying angles of incidence from the transverse center to the far ends thereof, the outer light emergent surface of said wall including vertically adjacent horizontally extending linear light reflecting-refracting prisms, the inner light incident surface including a first set of vertically extending and horizontally adjacent prisms, each prism of said first set having two active surfaces symmetrically disposed on either side of the plane through the apex thereof, said first set of prisms being centrally located at and laterally of said vertical plane, said inner surface including a second set of vertically extending and horizontally adjacent prisms formed laterally of said first set of prisms; the improvement comprising each prism of said second set of prisms consisting of two active curved surfaces asymmetrically disposed on either side of a plane extending through the apex thereof, one of said curved surfaces being entirely convex and sloping toward said vertical plane and toward said outer surface of said wall, and the other of said curved surfaces being entirely convex and sloping away from said vertical plane and toward said outer surface of said wall, and when said wall is disposed relative to said point light source at said predetermined distance, said one curved surface of each prism of said second set receiving an amount of incident light substantially equal to that received by said other curved surface of the same prism.

7. In the lens of claim 6 wherein one said wall receives light from the light source at vertical angles, the angles of slope of said curved surfaces of each prism of said second set are predetermined relative to said vertical angles of light for transmitting the same into a predetermined light pattern, the angles of slope of said surfaces and their refractive power varying from one said prism of said second set to the next.

8. In the lens of claim 7 wherein the depth of the prisms of said second set of prisms varies laterally from one prism to the next and from deep to shallow laterally from said vertical plane.

9. In the lens of claim 8, wherein a third set of prisms are located at a lateral position at the far end of the wall and the prisms thereof consist of a single curved surface which splits and diffuses light incident thereon, said curved surface sloping away from said vertical plane and away from said light source.

10. In the lens of claim 9, wherein the prisms of said second and said third sets of prisms are provided with straight return surfaces facing in the direction of said vertical plane and extending from the inner edges of said prisms toward said outer light emergent surface to the outer edges of next adjacent prisms, the light received from the light source by said straight surfaces passing to and being reflected by the outer surfaces of said wall back through said light incident surface.

References Cited by the Examiner
UNITED STATES PATENTS

| | | | |
|---|---|---|---|
| 563,836 | 7/96 | Blondel et al. | 88—60 X |
| 2,344,295 | 3/44 | Franck | 240—106.1 |
| 2,887,568 | 5/59 | Franck | 240—103 |

NORTON ANSHER, *Primary Examiner.*